United States Patent [19]

Miller

[11] Patent Number: 5,310,348

[45] Date of Patent: May 10, 1994

[54] SUTURE DEMONSTRATION PORTFOLIO

[75] Inventor: Eric Miller, Colombus, Ohio

[73] Assignee: United States Surgical Corporation, Norwalk, Conn.

[21] Appl. No.: 958,627

[22] Filed: Oct. 9, 1992

[51] Int. Cl.$^5$ ............................................. G09B 23/28
[52] U.S. Cl. ........................................ 434/262; 434/267
[58] Field of Search ................ 434/262, 267, 428, 429

[56] References Cited

U.S. PATENT DOCUMENTS

| D. 326,112 | 5/1992 | Zikria | D19/62 |
|---|---|---|---|
| 3,629,960 | 12/1971 | Roush | 434/429 |
| 3,658,365 | 4/1972 | Greubel | 434/429 X |
| 3,775,865 | 12/1973 | Rowan | 434/262 |
| 3,968,573 | 7/1976 | Poliniére | 434/428 X |
| 4,215,777 | 8/1980 | Strickland | 206/63.3 |
| 4,314,635 | 2/1982 | Fraser et al. | 206/232 |
| 4,321,047 | 3/1982 | Landis | 434/262 |
| 4,386,917 | 6/1983 | Forrest | 434/267 |
| 4,481,001 | 11/1984 | Graham et al. | 434/267 |
| 4,773,535 | 9/1988 | Cook | 206/373 |
| 4,789,340 | 12/1988 | Zikria | 434/272 |
| 4,832,372 | 5/1989 | Young | 281/31 |
| 5,059,052 | 10/1991 | Casper | 402/80 |
| 5,139,143 | 8/1992 | Pond | 206/373 |

Primary Examiner—Gene Mancene
Assistant Examiner—Cindy A. Cherichetti

[57] ABSTRACT

A surgical suture demonstration portfolio for demonstrating the use of various surgical sutures is provided. Suture packages and suture manipulating tools are provided in conjunction with an area having materials which facilitate demonstrating the sutures.

26 Claims, 3 Drawing Sheets

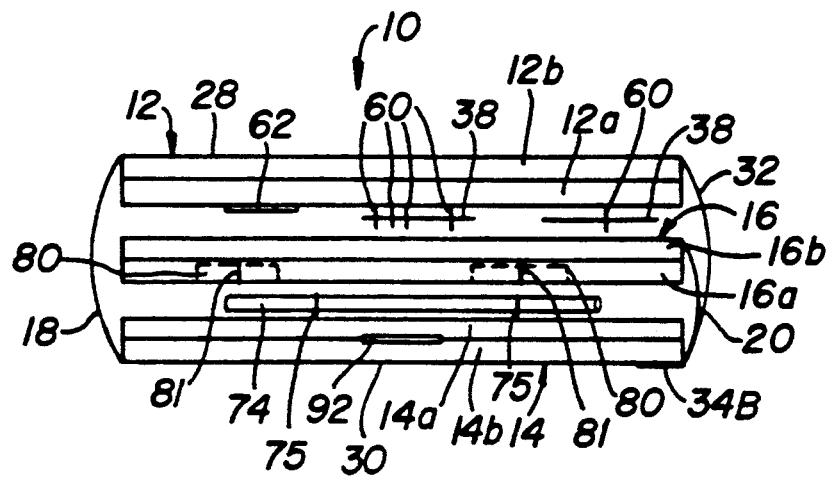
FIG_3
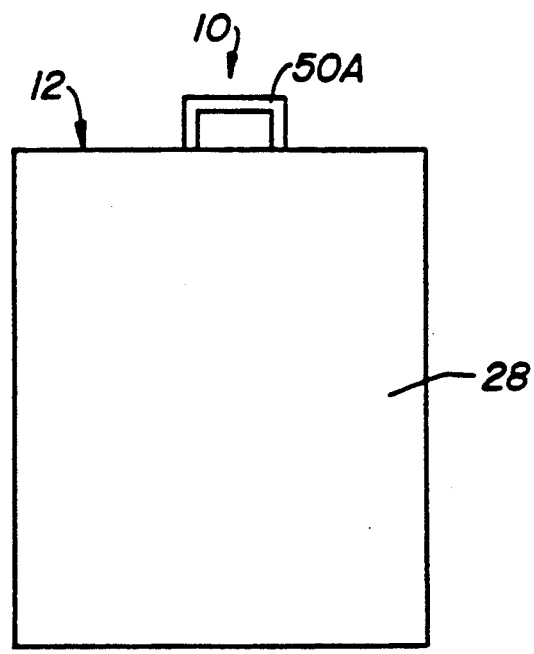
FIG_4

SUTURE DEMONSTRATION PORTFOLIO

FIELD OF THE INVENTION

The present invention relates to portable portfolios, and more particularly relates to portfolios adapted to show and demonstrate surgical needles and sutures.

DISCUSSION OF THE PRIOR ART

When marketing devices or other various instruments, sales people generally transport their goods in saddle bags, cases, or satchels that are adapted for carrying by hand. In the field of surgical suture and needle-suture sales, salespersons will generally carry packages containing various sutures and needle-suture combinations, suture tying and cutting instruments, suture and suture-needle demonstration devices and other miscellaneous items. When the suture sales representative meets with a potential purchaser, generally most of these items are shown at the same time. To do this, for example, the salesperson must carry all the above-mentioned items into a physician's office, attempt to lay the items out in an orderly manner, and then demonstrate to the physician how the sutures and needle-suture combinations will perform during surgical procedures.

Using current transportation devices, it is very cumbersome to carry out this demonstration in an orderly manner. For example, if only a small area is available, sutures must be presented one or only a few at a time and the area can become cluttered and disorganized rapidly. In addition, since both the salesperson's time and the physician's time is usually available for only a brief period, the act or acts of repeatedly searching in a carrying bag and presenting sutures and returning those sutures back to the bag, is a serious drawback in this marketing procedure.

It is therefore an object of the present invention to provide a portable suture and needle-suture demonstration portfolio that displays sutures, needles, instruments, and various other demonstration devices simultaneously, in a readily available orientation.

It is another object of the present invention to provide a portable suture and needle-suture demonstration portfolio that is light weight and easily transportable.

SUMMARY OF THE INVENTION

The present invention provides a novel suture and needle-suture demonstration portfolio which is easy to carry and use during marketing procedures. The portfolio comprises at least two relatively flat, planar panels joined together by at least one hinge arrangement, wherein at least one of the at least two panels is adapted to demonstrate the use of surgical sutures and needles. The portfolio can also provide a panel adapted for carrying a plurality of tools useful for manipulating sutures and needles and/or a panel adapted to carry a plurality of suture and needle-suture packages. In use, the portfolio can be kept in a folded or closed condition and conveniently transported to a demonstration location. At the demonstration location the portfolio can be unfolded or opened to present the aforementioned panels. The salesperson, or person to whom the portfolio is being presented, can then select various sutures, needle-suture combinations and/or tools and, by using the demonstration area, attempt various suturing techniques. As a result, the salesperson and surgeon, or other person to whom the portfolio is being demonstrated, have a convenient means for displaying and using the sutures and needle-suture combinations presented.

BRIEF DESCRIPTION OF THE DRAWINGS

The foregoing objects and other features of the invention will become more readily apparent and may be understood by referring to the following detailed description of illustrative embodiments of the suture demonstration portfolio taken in conjunction with the accompanying drawings in which:

FIG. 3 illustrates a side end view of the portfolio of FIG. 1, being shown in its closed position; and FIG. 4 illustrates a top view of the portfolio of FIG. 1, being shown in its closed position.

DETAILED DESCRIPTION OF THE PREFERRED EMBODIMENTS

Figure 1:
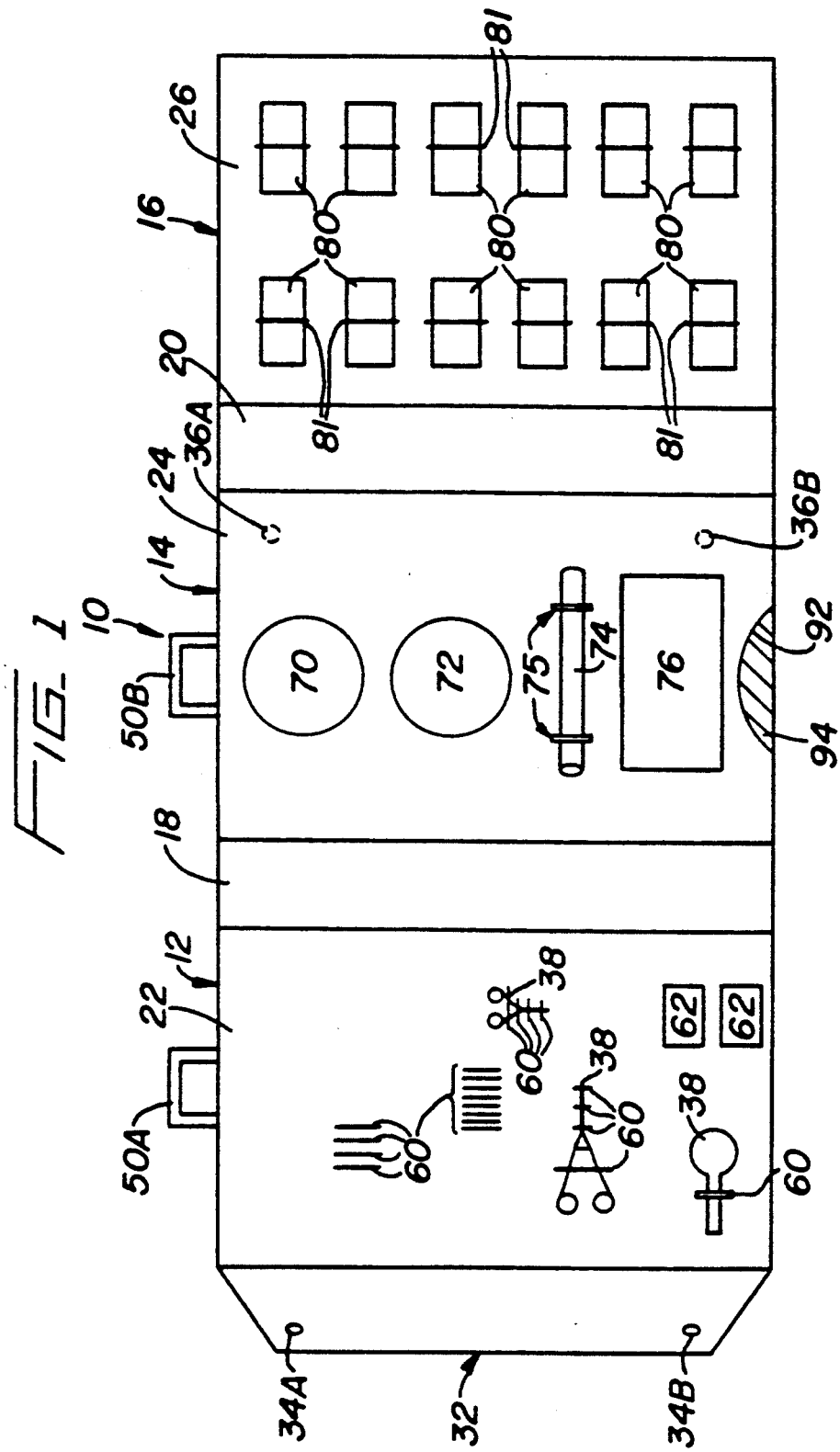
FIG. 1 illustrates a top view of a preferred embodiment of the suture demonstration portfolio of the present invention, with the portfolio being shown in its open position.

Referring now in specific detail to the drawings, in which like reference numerals identify similar or identical elements, FIG. 1 illustrates a preferred embodiment of the present invention. Portfolio 10 has three relatively flat, planar panel members 12, 14, and 16, illustrated in coplanar relation. Panel members 12 and 14 are connected together by a flexible hinge arrangement 18, and panels 14 and 16 are connected together by a flexible hinge arrangement 20. In this way, portfolio 10 can be opened up so as to expose its interior surfaces 22, 24 and 26 (FIG. 1), or closed up so as to present its exterior surfaces 28 and 30 (FIGS. 3 and 4). Preferably, exterior surfaces 28 and 30 are formed out of a tough, scuff-resistant material so that they can survive the usual bumps encountered during transport and so they can maintain a presentable appearance for demonstration. A flap 32 may be provided, as illustrated in FIG. 1, which is adapted to fold over the outer portion of hinge 20 when portfolio 10 is closed up. Flap 32 has snaps 34A and 34B for engaging corresponding snap elements 36A and 36B (in phantom) on exterior surface 30 of panel 14. Flap 32 preferably utilizes Velcro ® for securement to surface 30. Alternatively, a plurality of straps or other releasable fastening means can be provided to keep the portfolio in its closed position. A pair of handles, 50A and 50B are provided to aid in transporting portfolio 10 when in the closed position (see also FIG. 4).

It should be appreciated that inasmuch as each of the panel members 12, 14 and 16 have a substantial degree of thickness, hinge arrangements 18 and 20 are adapted to provide a degree of spacing between the adjacent panels so as to allow the panels to fold up on one another in the manner shown in FIG. 3.

Interior surface 22 of planar panel 12 is a tool-carrying surface which includes a plurality of hand tools 38 (e.g., forceps, cutting instruments, needle holders, magnifying glass, etc.). Tool-capturing loops 60 are provided to attach tools to surface 22. Loops 60 can be an elastic material attached to surface 22 or can be of releasable attachment means such as Velcro ® fasteners. Closable pouches 62, for holding small instruments, are also provided.

Turning to panel 14, materials are provided for demonstrating the use of surgical sutures and needle-suture combinations. For example, needle performance can be demonstrated by: resistance to bend; initial penetration; subsequent penetration; stability with a needle holder; ductility; 1:1 suture to needle ratio; and visibility. Suture performance can be demonstrated, for example, by: knot and run down characteristics; knot security; knot repositioning; drag through; tensile strength; loop pull strength; general handling; and first throw hold.

With reference to FIG. 1, areas 70, 72 and 74 generally consist of synthetic or natural materials which are useful for demonstrating the above characteristics. For example, area 70 can have a layer of goat skin. Area 72 can have a layer of at least one elastomer selected from the group consisting of natural rubber, styrene-butadiene rubber, styrene-butadiene-acrylonitrile rubber, polyisobutene, polyisoprene, silicone, silicone rubber, polyetherurethane and polyurethane. Area 74 illustrates an elastomeric material in the form of surgical tubing, secured to surface 24 by straps 75. Area 76 is essentially a work space wherein a surgeon or demonstrator can also manipulate sutures and suture-needle combinations.

Figure 2:
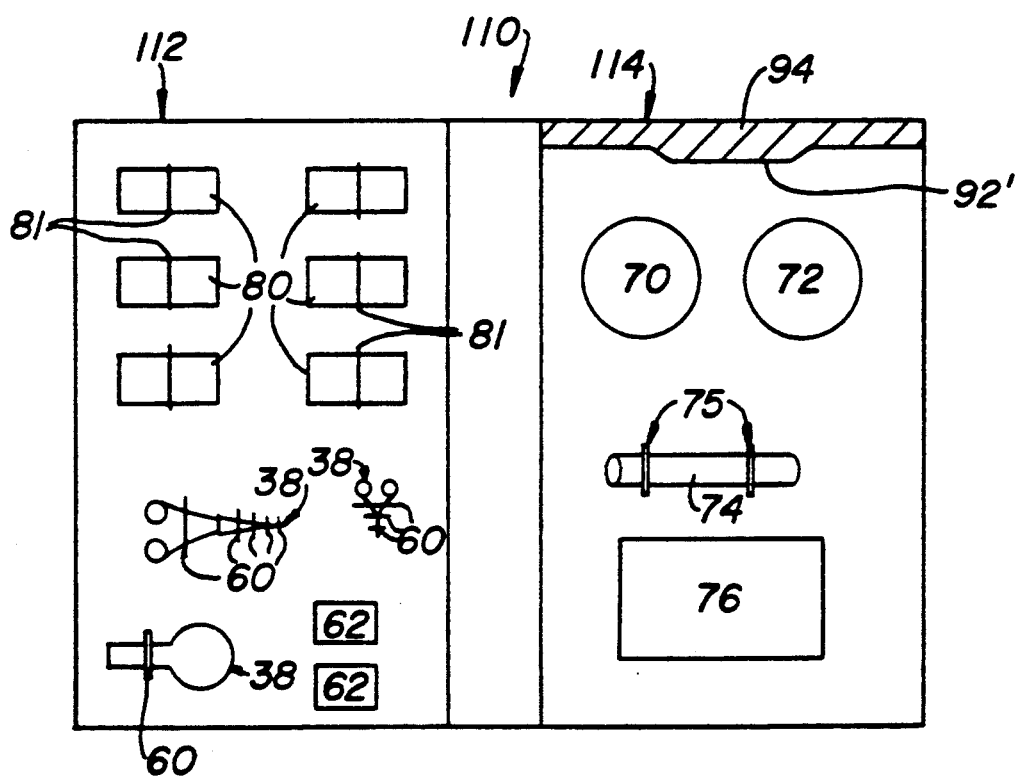
FIG. 2 illustrates a top view of an alternative embodiment of the present invention in its open position.

Panel 14 also includes a pocket 92 wherein brochures or other printed material 94 may be placed behind surface 24. FIG. 2 illustrates alternative embodiment of this brochure area, indicated as 92' (see discussion of FIG. 3 regarding pocket formation).

Panel 16 has several recessed pockets 80 on surface 26 in which suture and/or needle-suture packages (not shown) can be placed and be available for grasping or otherwise available for removal when desired. Elastic straps 81 are provided to hold the packages.

A best seen in FIG. 3, panels 12, 14, and 16 are preferably constructed of two subpanels 12a, 12b, 14a, 14b, and 16a, 16b, respectively, which are in a stacked relationship. This configuration permits constructing the portfolio by first attaching all or some of the aforementioned items (e.g., instruments, demonstration materials, suture packages, and/or straps etc.) to subpanels 12a, 14a and 16a, and then by attaching 12a, 14a, and 16a to 12b, 14b, and 16b, respectively. For example, recessed pockets 80 on surface 26 can be formed by cutting subpanel 16a prior to securement to subpanel 16b. This construction method also aids in forming pocket 92, shown in FIG. 1.

In use, the demonstration portfolio will be unfolded and a surgeon and/or demonstrator can select various instruments and various types of sutures and/or needle-suture combinations and proceed to use demonstrating panel 14. Specific combinations of tools, sutures and/or needle-suture combinations can be provided for demonstrating specialized procedures, e.g., cardiovascular procedures, ophthalmic procedures, etc.

Turning to FIG. 2, a two panel member suture demonstration portfolio is illustrated. Portfolio 110 has panel 112 hingedly connected to panel 114. Panel 112 has various suture manipulating instruments 38 disposed thereon and recesses 80 containing suture packages. Panel 114 has a suture demonstration area similar to that of panel 14 in FIG. 1. It is therefore within the scope of this invention to provide various combinations of suture instrumentation, suture demonstration or working areas and suture and/or needle-suture packages within a folded portfolio.

FIGS. 3 and 4 illustrate two views of suture demonstration portfolio 10 of FIG. 1 in a folded or closed condition. The panels of portfolio 10 are folded into a stacked relation by folding panel 16 over panel 14 and then by folding panel 12 over panel 16. Subpanels 12a, 12b, 14a, 14b, 16a and 16b are shown in FIG. 3 as previously described. Panel 12 has flap 32 folded over hinge 20 and snapped onto exterior surface 30 of panel 14. Handles 50A and 50B are thereby brought together to facilitate transportation.

While the invention has been particularly shown and described with reference to the preferred embodiments, it will be understood by those skilled in the art that various modifications in form and detail may be made therein without departing from the scope and spirit of the invention. Accordingly, such modifications are to be considered within the scope of the invention as defined by the claims.

It is further noted that the term "suture" in the claims is intended to include various types of suture and/or needle-suture combinations.

What is claimed is:

1. A surgical suture demonstration portfolio comprising at least two relatively flat, planar panel members hinged together such that said panel members can be positioned in a closed position in which said panel members are disposed parallel to and in stacked relation to one another, and an open position in which said panel members are disposed adjacent to and coplanar with one another, wherein at least one of said panel members comprises means for demonstrating the use of surgical sutures and at least one of said panel members comprises a tool-carrying surface having means to carry a plurality of tools thereon and to present said tools for grasping when said panel members are positioned in said open position.

2. The suture demonstration portfolio according to claim 1, wherein said suture demonstration means comprises a material which simulates the physical properties of animal tissue.

3. The suture demonstration portfolio according to claim 2, wherein said material simulates the physical properties of human tissue.

4. The suture demonstration portfolio according to claim 2, wherein said material comprises at least one elastomer selected from the group consisting of natural rubber, styrene-butadiene rubber, styrene-butadiene-acrylonitrile rubber, polyisobutene, polyisoprene, silicone, silicone rubber, polyetherurethane and polyurethane.

5. The suture demonstration portfolio according to claim 4, wherein said material is tubular in form.

6. The suture demonstration portfolio according to claim 2, wherein said material comprises animal tissue.

7. The suture demonstration portfolio according to claim 2, wherein said material comprises goatskin.

8. The suture demonstration portfolio according to claim 1, wherein at least one of said panel members comprises means to carry a plurality of suture packages and to present said suture packages for grasping when said panel members are positioned in said open position.

9. The suture demonstration portfolio according to claim 1, wherein said portfolio comprises first, second and third panels, and first and second hinge arrangements, said first panel being joined to said second panel by said first hinge arrangement, and said second panel being joined to said third panel by said second hinge arrangement.

10. The suture demonstration portfolio according to claim 9, wherein said first panel comprises a tool-carrying surface having means to carry tools, said second panel comprises means for demonstrating the use of surgical sutures, and said third panel comprises means to carry a plurality of suture packages.

11. The suture demonstration portfolio according to claim 10, wherein said suture demonstration means comprises a material which simulates the physical properties of animal tissue.

12. The suture demonstration portfolio according to claim 1, wherein said portfolio further comprises releasable fastening means for releasably maintaining said portfolio in said closed position.

13. The suture demonstration portfolio according to claim 1, wherein said portfolio further comprises handle means for carrying said portfolio when it is its said closed position.

14. The suture demonstration portfolio according to claim 1, wherein at least one of said panel members comprises means to retain a plurality of printed materials.

15. The surgical suture demonstration portfolio according to claim 1, wherein said means to secure said plurality of tools comprises at least one loop member disposed on at least one of said panel members.

16. The surgical suture demonstration portfolio according to claim 1, wherein said means to secure said plurality of tools comprises at least one pouch disposed on at least one of said panel members.

17. A suture demonstration portfolio comprising at least two relatively flat, planar panel members hinged together such that said panel members can be positioned in a closed position in which said panel members are disposed parallel to and in stacked relation to one another, and an open position in which said panel members are disposed adjacent to and coplanar with one another, wherein at least one of said panel members comprises means to secure a plurality of suture packages and to present said suture packages for grasping when said at least two panel members are positioned in said open position.

18. The suture demonstration portfolio according to claim 16, wherein at least one of said panel members further comprises a tool-carrying surface having means to carry a plurality of tools and to present said tools for grasping when said panel members are positioned in said open position.

19. The suture demonstration portfolio according to claim 18, wherein said tools are useful in manipulating surgical sutures.

20. The suture demonstration portfolio according to claim 19, wherein said tools comprise various combinations of forceps and cutting instruments.

21. The suture demonstration portfolio according to claim 17, wherein said means to secure said suture packages comprises at least one recessed pocket.

22. The surgical suture demonstration portfolio according to claim 21, wherein said pocket is formed by cutting at least a portion of the surface of at least one panel member.

23. The suture demonstration portfolio according to claim 17, wherein said means to secure said plurality of tools comprises at least one loop disposed on at least one of said panel members.

24. The suture demonstration portfolio according to claim 17, wherein at least one of said panel members is constructed of at least two subpanels in a stacked relationship.

25. A method of demonstrating the use of sutures comprising:
   a) providing at least two relatively flat, planar panel members hinged together such that said panel members can be positioned in a closed position in which said panel members are disposed parallel to and in stacked relation to one another, and an open position in which said panel members are disposed adjacent to and coplanar with one another, wherein at least one of said panel members comprises means for demonstrating the use of surgical sutures and at least one of said panel members further comprises providing means to secure a plurality of suture packages and to present said suture packages for grasping when said panel members are positioned in said open position; and
   b) presenting said portfolio to a surgeon.

26. The method according to claim 25, wherein the step of providing said panel members further comprises providing a tool-carrying surface having means to secure a plurality of tools thereon and to present said tools for grasping when said panel members are positioned in said open position.

* * * * *